W. H. COOK.
VEHICLE SPRING.
APPLICATION FILED JULY 22, 1915.
1,183,725.
Patented May 16, 1916.
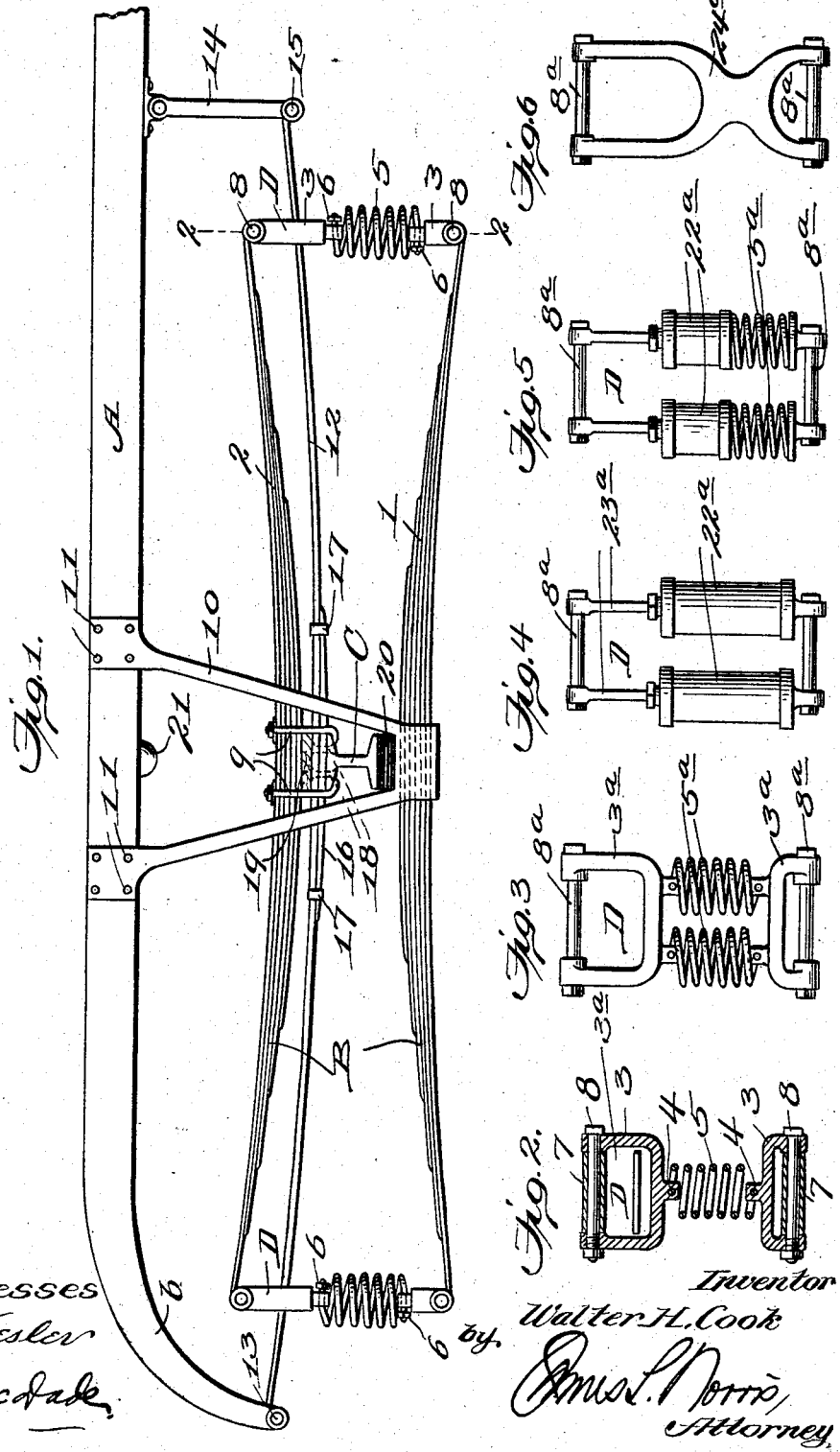
Witnesses
C. D. Kesler
M. E. McDade
Inventor
Walter H. Cook
by
James L. Norris
Attorney

UNITED STATES PATENT OFFICE.

WALTER H. COOK, OF NEW ORLEANS, LOUISIANA.

VEHICLE-SPRING.

1,183,725.     Specification of Letters Patent.     Patented May 16, 1916.

Application filed July 22, 1915. Serial No. 41,352.

*To all whom it may concern:*

Be it known that I, WALTER H. COOK, a citizen of the United States, residing at New Orleans, in the parish of Orleans and State of Louisiana, have invented new and useful Improvements in Vehicle-Springs, of which the following is a specification.

This invention relates to improvements in vehicle springs and more particularly to a construction of that type wherein a plurality of inter-related spring elements are employed.

The principal objects of the invention are to provide a vehicle spring which shall be sensitively and proportionately responsive to all shocks, including the lighter tremors or vibrations as well as shocks of heavy and sudden character, and in which the inter-related spring elements are connected by devices which provide resilient compensating balances and which participate in the shock absorbing action of the spring as a whole.

A further object of the invention is to provide a novel combination of a vehicle spring, constructed as stated, with a means for eliminating jerks incident to starting or to a sudden increase of speed whereby the said means serves the additional purpose of promoting the co-planar relation of the spring elements and of preventing side sway of the vehicle body.

A further object of the invention is to provide a vehicle spring organization of the character, and for the purposes stated, which shall be of compact and simple structural nature and well adapted to low hung vehicle frames.

An embodiment of the invention is illustrated in the accompanying drawings, wherein:—

Figure 1 is a side elevation showing the invention applied to the chassis of the vehicle; Fig. 2 is a sectional view taken on line 2—2 of Fig. 1; Figs. 3, 4, 5 and 6 illustrate modified forms of the resilient or elastic hinge connection for connecting the ends of the leaf springs, as shown in Fig. 2.

Like reference characters denote similar like parts through the specification and drawings.

In Fig. 1, the chassis of the vehicle is indicated at A and has the usual downwardly curved forward end *b*. B indicates a spring or shock absorber constructed in accordance with the invention and suitably secured to the chassis and axle C. The shock absorbing spring B consists of a pair of laminated leaf springs 1 and 2 slightly curved out of a straight line and having their convex sides in a spaced opposing relation. The opposing extremities of the springs 1 and 2 are connected by links D which include resilient shock relieving elements.

In the embodiment shown in Figs. 1 and 2, each link includes two substantially U-shaped members 3 connected to the respective springs 1 and 2. The closed ends of said U-shaped members are formed with the perforated projections 4 for the ends of the helical spring 5, said ends of the spring 5 being adapted to receive a fastening member such as the nut 6 for holding the spring in engagement with said U-shaped members. Said members 3 may be secured to the extremities of the springs 1 and 2 in any suitable or preferred manner; however, as here shown, the extremities of said springs 1 and 2 are rolled upon themselves to provide the cylindrical or loop portion 7 adapted to accommodate and have extend therethrough the bolt 8, which also extends through the free ends of said U-shaped members. The legs of the U-shaped members 3 secured to the ends of the spring 2 are comparatively longer than the U-shaped members 3 secured to the ends of the spring 1, and thus provide a comparatively large space 3ª between the closed end thereof and the cylindrical loop 7 of the spring 2. In securing the spring or shock absorber B, above described, to the vehicle, the upper laminated leaf spring 2 is rigidly and centrally secured to the axle C of the vehicle in any suitable manner, as, for instance, by the U-shaped clamp 9. The lower laminated leaf spring 1 is rigidly and centrally secured in the lower end of the V- shaped bracket 10, in turn secured by means of the fastening members 11 to the chassis. The spring 2 has no connection with the chassis and the spring 1 has no connection with the axle. The links D between said springs provide compensating balances and their resilient elements participate in the absorption of shocks as well as in their transmission from one spring to the other, at the same time easing the "whipping" of the ends of the springs. The rising and falling movements of the axle act directly on the spring 2 and the similar movements of the vehicle body act directly on the spring 1. Hence, lighter shocks, within a certain range, will be taken up almost wholly by the spring 2, the heavier shocks will be taken up by the spring 2 and the resilient elements 5 of the links D, and the heaviest shocks will be taken up by said spring 2, resilient elements 5 and the spring 1 simultaneously. In this way the spring is sensitively responsive to all shocks within the full range of its capacity and will substantially take up all shocks, both direct and reactionary.

To provide against longitudinal pull upon the shock absorbing means B from the axle C, a pull bar 12 is provided. This pull bar 12 may be of any suitable or preferred construction for securing in any approved manner the axle to the chassis or body of the vehicle. However, in the present showing, the bar is secured at its forward end to the extremity of the curved portion $b$ of the chassis A, as shown at 13, and has its rear end secured to the arm 14 depending from the chassis, as shown at 15. The pull bar 12 extends longitudinally of the vehicle and through the spaces $3^a$ formed in the upper U-shaped members 3 of the connecting springs D. The central portion of the pull bar 12 is reinforced by the plate 16 removably secured thereto by means of the clamping bands 17. The pull bar, including the reinforcing plate 16, is rigidly secured at its central portion to the axle C by means of the screw bolts 18. As shown in the drawings, the bar 12 is coextensive with and lies below the spring 2 and is additionally secured to the axle C by the clamp 9 which secures said spring to the axle, there being interposed between the pull bar 12 and the spring 2 a spacing block 19 which prevents said bar and spring from conflicting when operating. It will thus be seen from the above that all pull between the axle and the frame of the vehicle will be transmitted through the pull bar so as to relieve the shock absorbing means B of all pulling strain and thereby permit an uninterrupted and thorough shock absorbing operation of the mechanism B. The bracket 10 also functions in preventing excess whipping of the spring 1, by arresting the whipping motion of the latter when the axle rebounds to assume its natural position. A rubber block 20, resting in the sling formed by the V-shaped bracket 10 and upon the spring 1, provides a bumper limiting the downward movement of the axle C, while the rubber bumper 21 carried by the chassis limits the upward movement of the axle C and spring 2.

Fig. 3 discloses a modified form of the resilient link connection D according to which the U-shaped members $3^a$ are provided with a plurality or pair of helical springs $5^a$.

Fig. 4 discloses a further modification of the elastic link connection D which, in this instance, consists of the two dash pots $22^a$ and their respective plungers $23^a$, both dash pots and plungers being linked together by the connecting bolts $8^a$. Fig. 5 shows a combination of the structures shown in Figs. 3 and 4, namely; the use of the two dash pots $22^a$ seated upon the helical springs $5^a$. Fig. 6 shows a solid inelastic hinge connection for the extremities of the springs 1 and 2 consisting of the member $24^a$ having its opposite ends bifurcated and adapted to receive the connecting bolts $8^a$.

In all of the forms disclosed the pull bar 12 is disposed in the same longitudinal plane as the various elements of the spring and assists in maintaining the co-planar relation of these elements and in preventing side sway of the vehicle body. This result is secured by extending said pull bar, in the forms shown in Figs. 2, 3 and 8, through the upper U-shaped members of the links D and, in the forms shown in Figs. 4 and 5, between the plungers $23^a$.

It will be understood that certain changes as to the precise construction and combination of parts may be resorted to that fall within the legitimate scope of the appended claims.

What is claimed is:—

1. The combination with side bars of a vehicle frame and an axle of a spring organization comprising a leaf spring secured at a central point to the axle, a second leaf spring co-planar with and arranged below the first one, means supporting said second leaf spring at a central point thereof from the adjacent side bar of the vehicle, said leaf springs being curved from end to end and having their convex sides in spaced adjoining relation, and links connecting the adjacent extremities of said leaf springs and having resilient shock absorbing devices incorporated therewith.

2. The combination with the side bars of a vehicle frame and an axle of a leaf spring secured at a central point to the axle, a second leaf spring co-planar with the first spring, means connected to a central point of the second spring for supporting it from the adjacent side bar of the vehicle, links connecting the adjacent extremities of the springs and including spaced vertically disposed parts, and a pull bar connected at a central point to the axle and having its extremities connected to the side bar of the vehicle frame, said pull bar extending between the vertical parts of said links and aiding in maintaining the co-planar relation of the elements of the spring organization and in preventing side sway of the vehicle frame.

In testimony whereof I have hereunto set my hand in presence of two subscribing witnesses.

WALTER H. COOK.

Witnesses:
 JOHN RIDGLEY,
 THOMAS RIDGLEY.

Copies of this patent may be obtained for five cents each, by addressing the "Commissioner of Patents Washington, D. C."